April 11, 1950 A. D. RICHARDSON 2,503,298

TENSION CONTROL FOR GALVANOMETER SUSPENSION

Filed March 13, 1948

INVENTOR.
ARTHUR D. RICHARDSON

BY

James B. Christie

ATTORNEY

Patented Apr. 11, 1950

2,503,298

UNITED STATES PATENT OFFICE 2,503,298

TENSION CONTROL FOR GALVANOMETER SUSPENSION

Arthur D. Richardson, Pasadena, Calif., assignor to Consolidated Engineering Corporation, Pasadena, Calif., a corporation of California Application March 13, 1948, Serial No. 14,789

11 Claims. (Cl. 171—95)

This invention relates to galvanometers of the type adapted to respond to alternating or oscillating voltages, and more particularly to the type of laboratory and portable galvanometers used for recording alternating voltage oscillation.

In my co-pending application, Serial No. 673,111, filed May 29, 1946, an improved galvanometer of the above type was described and illustrated. The present invention relates to a frequency control device particularly adapted for use with a galvanometer constructed in accordance with the above mentioned application.

The galvanometer, constructed as described in co-pending application, Serial No. 673,111, comprises an extremely light weight fine wire coil held in suspension between a pair of stretched wires anchored at opposite ends of a small rectangular casing and comprising the axis of rotary motion of the galvanometer coil. A pair of pole pieces are disposed in close association with the coil and extend beyond the side of the case for engagement by a suitable magnet.

The galvanometer above described has a fixed frequency determined by the free length of the suspension wire intermediate the opposite points of anchorage to the case. The present invention provides means for varying the galvanometer frequency by varying the free length of the galvanometer coil suspension wire.

The frequency adjuster means in accordance with the present invention comprises a curvilinear leaf spring adapted to fit snugly within the galvanometer case and slidable therein, a solid disk rotatable in the spring, and a cylindrical insert rotatable in the disk, the spring, disk and insert being slotted to permit passage of the suspension wire therethrough. By means of this apparatus the effective free length of one end of the coil suspension wire may be altered by rotating the insert with respect to the disk so as to crimp the wire between the opposite ends of the insert slot. To compensate for the resultant lateral displacement of the suspension wire, the disk is counter-rotated to recenter the coil supporting end of the wire. The frequency controller together with the method of use thereof will be more clearly understood from the following detailed description taken in relation to the accompanying drawing in which:

Figure 6:
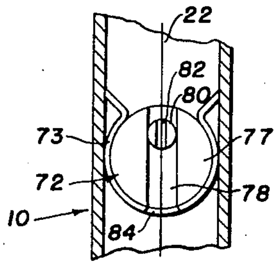
Figure 7:
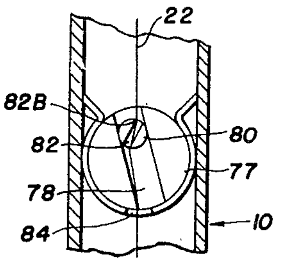

Fig. 6 is a sectional elevation of a portion of a galvanometer case showing the orientation of the frequency controller therein and orientation of the various elements of the controller in position for adjustment thereof with respect to the case; and Fig. 7 is a sectional elevation of a portion of the galvanometer case, showing the orientation of the individual elements of the controller in position to determine the frequency of the galvanometer.

Figure 1:
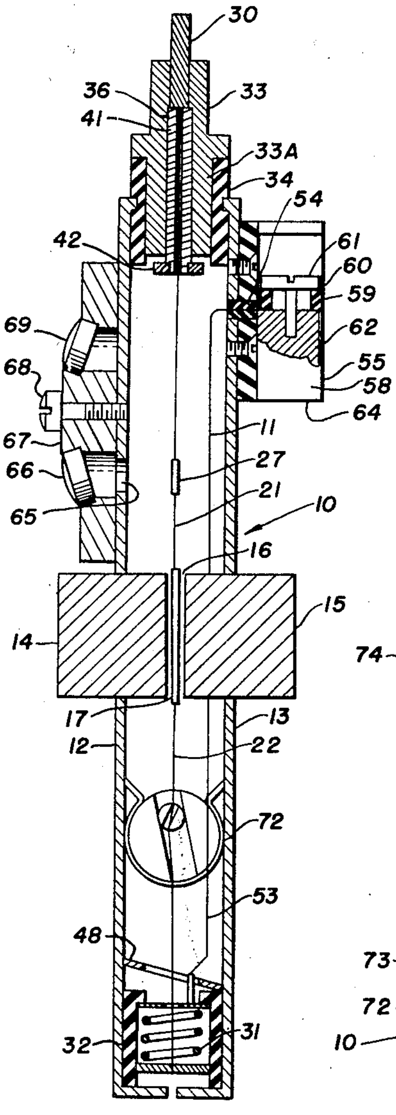
Fig. 1 is a sectional elevation of the galvanometer constructed in accordance with the teaching of the aforementioned co-pending application showing the placement of the frequency controller therein.
Figure 2:
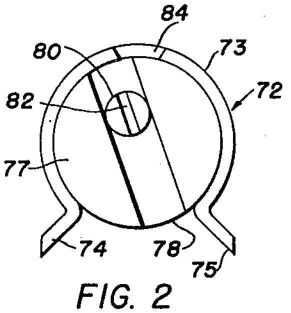
Fig. 2 is an enlarged plan view of the frequency control device of the invention.

The galvanometer shown in sectional elevation in Fig. 1 is identical to the instrument described and illustrated in detail in the aforementioned co-pending application and comprises a casing 10 in the form of a square or rectangular prism whose length is many times longer than its cross sectional dimensions. The casing comprises an elongated back strip 11 and two side strips 12 and 13. A cover (not shown) of substantially the same shape as the back member 11 completes the casing. There are fastened through the sides 12, 13 of the casing a pair of pole pieces 14, 15 respectively and these are rigidly fastened in position in the case in a suitable manner so as to leave a gap 16 between the two pole pieces in a central location in the case.

There is suspended between the gap 16 between the pole pieces, an elongated coil 17 of fine wire shaped to occupy a very small cross-sectional area. As described in the aforementioned co-pending application the coil 17 is composed of fine insulating wire, such as #48 enamel, or even finer, and may be on an arbor formed suitable for winding such fine wires. The winding is preferably done in such a manner that the coil is substantially cylindrical in form with a circular cross section. Wires forming this coil are preferably cemented together so that the coil maintains a rigid self-supporting form.

There is inserted inside each extremity of the coil a semi-circular member in the form of a half disk (not shown) with its straight edge at the loop of the coil. For the purpose of suspending the coil in position in the air gap 16 there are provided thin suspension wires 21, 22 at each end of the coil, these suspension wires being looped through the coil and inside the arcuate surfaces of the respective half disks (not shown). The ends of the fine wire forming the coil 17 are brought out loosely and preferably are looped around respective loops of the suspension wires 21, 22. The aforementioned loops at the coil ends of the wires 21, 22 are maintained by soldering and the ends of the wire forming the coil 17 are also soldered at the point, thereby making the wires 21, 22 in effect, the terminals of the coil.

The wire 21 has attached to it above the coil 17 a small rectangular mirror 27. The means of mounting the mirror 27 on the suspension wire 21 is described in detail in the aforementioned co-pending application.

For the purpose of suspending this mirror and coil assembly centrally within the casing, a wire holding member 30 in the form of a cylindrical rod is mounted at one end of the case and at the other end of the casing a compression spring 21 is held within an insulator portion 32, the wire 22 being hooked to the spring. For the purpose of holding the member 30, there is provided a bushing 33, preferably of metal such as brass like the metal of the casing. The bushing 33 is provided with a cylindrical sleeve portion 33A which fits within an insulating bushing 34. A cylindrical bore 36 passes centrally through the bushing. The outer portion of the bushing is provided with a small cylindrical bore through which the cylindrical rod 30 passes with a tight fit. The wire 21 is anchored to the inner end of the rod 30.

For the purpose of centering the wire 21 and adjusting its respective length, there is provided a sleeve 41 having a collar 42 at its inner end. This sleeve has a cylindrical shank which is adapted to slide with a tight fit in and out of the bushing 33 and is also provided with a protuberance (not shown) located at a central position along the longitudinal axis of the sleeve so that the wire 21 in resting on this protuberance is centered in the casing.

The end of wire 22 is soldered to a hook (not shown) extending above the spring 31. For the purpose of holding the spring and bushing assembly at proper position within the end of the casing, there is provided a holding member 48 in the form of a horseshoe. This is wedged within the casing so that it rests against the sides thereof, and the tendency of the spring to compress pushes the inner end of the bushing 32 against the wedged end of member 48 so that it maintains its position.

The length of wire 22 is such that when the aforementioned hook is hooked over the end loop of spring 51, the spring is compressed somewhat against member 48, so that wires 21, 22 are stretched with substantial tension. The hook (not shown) is of electrical conducting material making contact with the spring 32 thereby putting the spring in circuit with the galvanometer coil. A suitable connecting wire 53 is soldered at the inner end of the spring 32 and is led through the galvanometer casing past the pole pieces 14, 15 and is carried through the side 13 of the casing through an insulating bushing 54 into the interior of a terminal casing 55.

Terminal casing 55 is of insulating material such as fiber or Bakelite, or the like and is fastened to the galvanometer casing. Casing 55 has a rectangular or square cross-section and is provided with an opening 58 running centrally through it. A collar 59 is located within the opening and is provided with a shoulder 60 to accommodate the head of a machine screw 61. The end of the machine screw is threaded into the drilled and threaded end of a thick metallic conducting wire 62 which is led into the terminal casing through an opening 64. The uninsulated end of wire 53 is carried through bushing 54 and into the terminal casing 55 to a position between the lower edge of the collar 59 and the upper end of the connecting wire 62 so that the drawing up of the wire 62 by turning the screw binds the wire 63 between the collar and the connecting wire.

When the galvanometer is assembled, the mirror 57 is located adjacent an opening 65 through wall 12 of the galvanometer casing with the face of the mirror towards the opening so that light will shine on the mirror and be reflected on it back through the opening. A suitable lens 66 is held in juxtaposition to the opening. As described in my co-pending application, the lens may be held in a lens holder 67 rotatable about a pivot point 68 so as to dispose a second lens 69 adjacent the opening 65 if desired.

In a recording camera or oscillograph it is common to use a number of galvanometers of the type described, and to place them as closely together as practicable so that all the galvanometers can make a record on a single sheet of photographic paper or film which is drawn past them while they are in oscillation. The galvanometer described is particularly adaptable to this multiple application because of the narrow casing. Generally a single magnetizing means is provided for magnetizing the pole pieces 14 and 15 and identical pole pieces on the plurality of juxtaposed galvanometers. The means of magnetizing these individual pole pieces forms no part of the present invention.

As described, the galvanometer has a substantially fixed frequency determinable by the length of the combined suspension wires 21, 22 and the coil 17 between the points of contact of the respective suspension wires with the sleeve 41 at the upper end of the case and with the spring 31 at the lower end of the case. The frequency controller of the present invention is adapted for incorporation in the galvanometer as described and may be manually operated to adjust the frequency thereof over a comparatively wide range.

The frequency controller 72 illustrated in Figs. 1 to 5 comprises a non-magnetic leaf spring 73 which is partially circular in plan and elongated in elevation (see Fig. 4) and provided with outwardly extending gripping legs 74, 75. The outside diameter of the spring corresponds to the inside diameter of the case 10 of the galvanometer so that the spring will hug the walls 12 and 13 thereof. Similarly the legs 74, 75 are shaped so that their outer ends will conform to the casing and will exert a degree of tension thereon. The spring is so constructed that it bears on the inside walls of the casing with sufficient force to retain it in position after adjustment, and at the same time leaving it free enough to permit manual adjustment lengthwise of the case.

Figure 5:
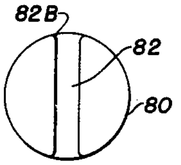
Fig. 5 is an enlarged plan view of the metal insert.
Figure 3:
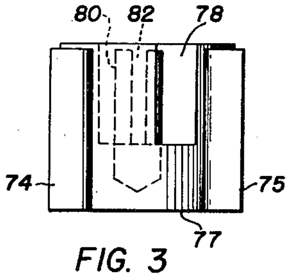
Fig. 3 is an elevation of the apparatus as shown in Fig. 2.
Figure 4:
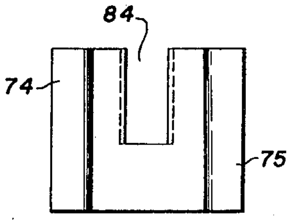
Fig. 4 is an elevation of the supporting spring with the disk removed.

The spring 73 encloses a rotatable insulator disk 77. The disk 77 is provided with a diametric slot 78 across its upper face and houses a cylindrical insert plug 80 also having a diametric slot 82 in its upper face. The insulator disk 77 is rotatable within the spring 73 and the insert 80 is likewise rotatable in the insulator. The spring 73 has a notch 84 in its transverse wall of substantially the same width as the slot 78 in the disk 77. As shown in Fig. 5, the slot 82 in the insert 80 has slightly rounded end edges which bear upon the suspension wire 22 as hereinafter described.

In assembly of the galvanometer the frequency control device is inserted into the case in the manner shown in Fig. 6 with the slots parallel to and aligned with the center of the case. With the slots so aligned the suspension wire 22 projects therethrough without engagement with the walls of the slot 82 in the insert 80. To change the frequency by varying the length of the wire 22 the insert 80 is rotated clockwise as viewed in Fig. 7 so that the wire 22 is off-set through the slot 82 in the insert. This naturally results in a small lateral shift in both ends of the wire 22, the shift in the upper end being undesirable as throwing the coil 17 off the center line of the galvanometer.

To compensate for the lateral shift in the upper end of the wire 22, the insulator disk 77 is rotated clockwise to bring the upper edge 82B of the slot 82 against which the wire 22 bears back to the center line of the galvanometer.

With respect to Fig. 7 the frequency of the galvanometer is determined by the free length of the wire 22 lying above the point of engagement thereof with the edge 82B of the slot 82. To change the frequency the spring 73 is slid upwardly or downwardly in the case 10 as required and the suspension wire, in its off-set condition, slides freely past the edges of the insert 82. Thus it is not necessary to realign the slots for adjustment purposes.

The individual elements of the frequency controller may be made from a wide range of material providing only that they be non-magnetic. Thus the spring may be made of non-magnetic metal such as brass, Phosphor bronze, beryllium copper, stainless steel or the like, the insulator disk may be made of non-magnetic material or preferably of any type of rigid plastic, and the insert may be made of non-magnetic metals such as brass, stainless steel or the like. A metallic insert is preferred for the reason that the inherent cold flow of substantially all plastics will introduce a source of error if the insert is made of plastic. Thus the only limitations on the material from which the device may be made are (1) sufficient rigidity in the spring to insure retention thereof at the point of setting, and (2) the use of non-magnetic materials which will not interfere with the operation of the galvanometer.

I claim:

1. In a galvanometer having a wire coil suspended from both ends by a wire strand enclosed in a case, a frequency controller comprising a spring adapted to fit snugly within the case and slidable therein, a solid member rotatably held within the spring, and an insert rotatable in the solid member, the insert being slotted and so disposed that one end of said wire passes through the slot.

2. In a galvanometer having a wire coil suspended from both ends by a wire strand enclosed in a case, a frequency controller comprising a spring adapted to fit snugly within the case and slidable therein, a core rotatably held within the spring and an insert rotatable in the core, the core and insert being slotted and so disposed that one end of said wire passes through the slots.

3. A frequency controller according to claim 2 wherein the spring, core and insert are non-magnetic.

4. A frequency controller according to claim 3 wherein the spring and insert are non-magnetic metal and the core is plastic.

5. In a galvanometer having a wire coil suspended from both ends by a wire strand enclosed in a case, a frequency controller comprising a curvilinear leaf spring adapted to fit snugly within the case and slidable therein, a disk held within the confines of this spring and rotatable therein, and an insert rotatable in the disk, the disk and insert being slotted and held by the spring so that one end of said wire passes through the slots.

6. A frequency controller adapted for use in a galvanometer having a wire coil suspended from both ends by a wire strand enclosed in a case, comprising a curvilinear leaf spring adapted to fit snugly within the case and slidable therein, a solid disk held within the confines of the spring and rotatable therein, and a cylindrical insert rotatable in the disk, the spring, disk and insert being slotted to permit passage of one end of said wire therethrough.

7. A frequency controller according to claim 6 wherein the spring, disk and insert are non-magnetic.

8. A frequency controller according to claim 7 wherein the spring and insert are metallic and the disk is plastic.

9. A frequency regulator for torsional galvanometers of the type having a coil suspended in a case by opposing suspension wires, comprising a curvilinear metallic leaf spring adapted to fit snugly within the case and slidable therein, a non-magnetic disk rotatable within the spring and having a diametric slot in a flat face thereof, a cylindrical non-magnetic insert rotatable in the disk and substantially blocking said slot, a diametric slot in the insert, and a slot in the leaf spring on the center line of the case.

10. A frequency regulator according to claim 9 wherein the slot in the insert has rounded end edges.

11. In a galvanometer having a rectangular case and a wire coil suspended within the case on the longitudinal axis thereof by wire strands extending from opposite ends of the case, a disk shaped member disposed in the case between the wire coil and one end of the case, the diameter of the disk shaped member being substantially equal to the width from side to side of the inside of the case so that the member engages the side walls of the case at diametrically opposite points on its circumference, the member being free to slide in the case between one end thereof and said wire coil and free to rotate on an axis transverse to the longitudinal axis of the case and parallel to the sides thereof, an insert rotatably mounted in the disk shaped member, the insert being slotted and so disposed that one of said wire strands passes through the slot.

ARTHUR D. RICHARDSON.

REFERENCES CITED

The following references are of record in the file of this patent:

UNITED STATES PATENTS

| Number | Name | Date |
|---|---|---|
| 383,275 | Bowers | May 22, 1888 |
| 1,563,141 | Aslanian | Nov. 24, 1925 |
| 1,811,738 | Williams | June 23, 1931 |